Patented July 31, 1928.

1,679,002

UNITED STATES PATENT OFFICE.

NORMAN B. PILLING, OF ELIZABETH, AND JOHN G. SCHOENER, OF BAYONNE, NEW JERSEY, ASSIGNORS TO THE INTERNATIONAL NICKEL COMPANY, OF NEW YORK, N. Y., A CORPORATION OF NEW JERSEY.

WELDING ELECTRODES.

No Drawing. Application filed October 19, 1925. Serial No. 63,555.

Our invention relates to the art of arc welding, and particularly to the use of Monel metal or nickel or nickel alloy in wire or rod form, where the parts to be welded form one electrode of an arc and a wire or rod which supplies the welding metal forms the other electrode.

In studying fusion welding we have found it advantageous to bear in mind its analogy to the production of metal castings, as a fusion weld is a chill casting shaped by surface tension forces, gravity and the restraint of the metal surfaces to be joined. In casting a great many of the metals it is found not sufficient simply to eliminate objectionable impurities, but advantageous to introduce in small amount certain elements such as carbon, silicon and manganese which have been found by experience to insure the elimination of blowholes and other unsoundness, and secure a dense, readily workable metal. Much difficulty in fusion welding we believe is due to the adverse conditions under which fusion for welding is necessarily done, causing exposure of superheated liquid metal with a relatively great proportion of surface area to the oxidizing attack of the atmosphere.

In order to confine the fusion locally, a high rate of heating is necessary and this inevitably results in some superheating of the fused metal. In oxyacetylene welding the rate of heating is relatively moderate and in addition the fused parts are protected to some extent from exposure to air by the gases of combustion. In the metallic arc, on the other hand, in which the work to be joined forms one electrode of an arc, and a filler rod, which is to supply the extra metal to complete the weld, the other, the heating rate is much higher and in addition due to the almost complete absence of reducing elements the fused surfaces of both the filler rod and the weld are fully exposed to the oxidizing action of the air at temperatures at which chemical action is very rapid. A natural result is the preferential oxidation and diminution of the small quantities of such essential ingredients as carbon, silicon and manganese to a dangerously low point resulting either in the formation of blowholes or even of a fluid metal containing dissolved oxides which will produce gases such as carbon monoxide by simple contact with a carbon-bearing metal, such as freshly melted nickel, Monel metal, cast iron, etc.

We have discovered that we can largely or entirely overcome this trouble by associating with the filler rod, preferably as a coating or core therefor, a highly reducing metal of high boiling point, such as titanium, or an alloy thereof, such as ferrotitanium. We have also found that the action is improved by the use, with the rod, of an associated metal which is of relatively low boiling point and will form a reducing atmosphere around the arc and tend to exclude oxygen from the region of highest temperature. Calcium is an example of such a low boiling point metal and is preferably used in alloy form, such as calcium-silicon. Such calcium alloys are relatively stable and unattacked by atmospheric moisture and organic solvents and may also be readily pulverized.

We consider one metal reducing as compared with another, when the first metal will displace the second from combination with a third element or group of elements. As used herein, we define metals of high boiling point as being those which are not vaporized to any great extent from the molten weld metal at the welding temperature.

In practice we prefer to mix a pulverized titanium alloy and a pulverized calcium alloy and apply the same to the welding rod in paste or paint form. Commercial titanium alloys containing 10% to 30% titanium are found to be quite suitable. We prefer the lower carbon form of ferrotitanium, as it can readily be reduced to powdered form. Commercial calcium alloys containing 15% to 35% calcium, or calcium metal, all of which are readily obtainable have been found to be suitable. We prefer the stable brittle alloys of calcium, as they may be readily reduced to a powdered form.

As an example of preparing a Monel metal welding rod, we take low carbon ferrotitanium with a titanium content of about 25 per cent and calcium-silicon containing about 25 per cent calcium. Both of these alloys are brittle and can readily be ground to fine powder. After reducing both, separately, to 80 mesh powder, they are mixed to give a ratio of titanium to calcium of about 3 to 1. The dry powder is then mixed with sufficient liquid binding material to enable it to be applied as a coating to a metallic rod as by dipping or brushing. For this purpose we have found liquid shellac suitable.

One good electric coating contained the following elements, based on the composition of titanium and calcium alloys of currently available grades:

|  | Per cent. |
|---|---|
| Titanium | 19 |
| Calcium | 6 |
| Aluminum | 5 |
| Silicon | 17 |
| Iron | 53 |

The ingredients other than titanium and calcium we consider are relatively unimportant in welding as long as care is taken to allow no known injurious element to be introduced. The coating may be added to the electrode in any desired proportion, the total percentage of titanium and calcium, however, should be more than .5% and less than 10% than the weight of the electrode itself.

The welding electrode preferably comprises a base metal, a titanium alloy and a calcium alloy as entities which are capable of being physically held together or satisfactorily associated. In respect to the base metal, it is preferred to use nickel or nickel-copper alloy both containing appreciable quantities of carbon, silicon and mangenese, and other elements usually present in the commercial grades of metal. Such a base metal may be herein defined as normal.

The advantages of our invention will be apparent to those skilled in the arc welding art, since a much better weld is obtained, particularly with a Monel metal filler stick, and especially on parts of Monel metal and cast iron. The invention may also be used in welding nickel, nickel alloys and other metal and metal alloy parts, since the invention aids in preserving unchanged the fused portions of the parts to be welded and gives protection to prevent undesirable changes in the metals during fusion and welding. Thus, the constituents or elements constituting the metal to be welded and the constituents or elements in the welding electrode or rod, are substantially all preserved and present in the weld as finally completed.

A further advantage resulting from the use of our electrode coating is that arc welding may be carried out without particular reference to the polarity of the filler rod electrode. In welding nickel and nickel alloys, such, for example, as Monel metal, it has heretofore been found necessary to employ direct current, making the filler rod the positive electrode in order to secure an arc suitable for satisfactory welding. If the filler rod is made the negative electrode, the arc is unstable, frequently goes out and does not permit the continuous application of heat to the weld. If it is made the positive electrode these difficulties are greatly lessened. By using the filler rod coated as above described these differences depending on electrode polarity largely vanish and good welds can easily be made with either polarity. In consequence, it is now possible to make arc welds of these metals using the alternating current arc, which heretofore for the reasons just discussed had not been a practical thing to do.

While we have given a theory of our invention explaining the action of titanium and calcium, we do not consider the value of this invention to be dependent on its correctness, since considerable practical use has proven its usefulness and success.

Other high boiling point metals, such as zirconium, or its alloys may be used instead of titanium, though we do not find its action equal to that of titanium. The associated metal or alloy may be used as a core within a hollow welding wire or rod or may be associated with the weld in other ways without departing from our invention. By the word "metal" in our claims we also intend to include alloys.

We claim:

1. An arc welding electrode comprising a normal nickel-copper alloy, and a coating therefor, said coating consisting approximately of 19% titanium, 6% calcium, 5% aluminum, 17% silicon, and 53% iron.

2. An arc welding electrode comprising a normal nickel alloy, and a coating in which there is approximately 19% titanium, and approximately 6% calcium.

3. In an arc welding electrode comprising a normal nickel or nickel-copper alloy filler rod, and a coating therefor, said coating having included therein an alloy containing 10–30% titanium and an alloy of calcium, the proportion of titanium to calcium present being approximately 3 to 1.

4. An arc welding electrode for producing a sound and ductile weld between nickel or nickel alloy parts, said electrode comprising a normal nickel alloy, a titanium alloy containing 10 to 30% titanium, and a calcium alloy containing 15 to 35% calcium, all as separate entities, and which are physically held together by a binder, the total percentage of said titanium and said calcium to the total weight of the electrode being greater than .5% and less than 10%.

5. An arc welding electrode comprising a Monel metal filler rod, and a coating therefor, said coating having substantial amounts of titanium and calcium therein, the total percentage of said titanium and said calcium to the total weight of the electrode being greater than .5% and less than 10%, and the titanium content being approximately three times greater than the calcium content.

In testimony whereof we have hereunto set our hands.

NORMAN B. PILLING.
JOHN G. SCHOENER.

CERTIFICATE OF CORRECTION.

Patent No. 1,679,002.

Granted July 31, 1928, to

NORMAN B. PILLING ET AL.

It is hereby certified that error appears in the printed specification of the above numbered patent requiring correction as follows: Page 2, line 16, for the word "electric" read "electrode"; and that the said Letters Patent should be read with this correction therein that the same may conform to the record of the case in the Patent Office.

Signed and sealed this 28th day of August, A. D. 1928.

(Seal)

M. J. Moore,
Acting Commissioner of Patents.